United States Patent [19]

Lauer

[11] Patent Number: 4,657,117

[45] Date of Patent: Apr. 14, 1987

[54] ELEVATOR POWER SUPPLY AND DRIVE SYSTEM

[75] Inventor: Robert J. Lauer, Toledo, Ohio

[73] Assignee: Schindler Haughton Elevator Corporation, Toledo, Ohio

[21] Appl. No.: 626,893

[22] Filed: Jul. 2, 1984

[51] Int. Cl.$^4$ ............................................. B66B 1/00
[52] U.S. Cl. .................................. 187/114; 187/112; 318/146; 318/150; 322/4
[58] Field of Search .................... 187/29 R, 17, 19, 20, 187/23, 25, 26; 318/8–15, 140, 146, 147, 148, 149, 150, 151, 152, 153, 154, 161, 158; 310/113; 322/4

[56] References Cited

U.S. PATENT DOCUMENTS

| | | | |
|---|---|---|---|
| 547,834 | 10/1895 | Baldwin | 318/150 |
| 1,048,985 | 12/1912 | Marburg | 322/4 X |
| 1,188,202 | 6/1916 | Whiting | 318/150 X |
| 1,258,116 | 3/1918 | Simon | 322/4 |
| 1,297,953 | 3/1919 | Whiting | 318/150 |
| 1,476,978 | 12/1923 | Jeffrey | 322/4 |
| 1,961,416 | 6/1934 | Luca | 318/161 |
| 2,376,421 | 5/1945 | Drake | 322/4 X |
| 2,484,260 | 10/1949 | Whitney | 318/150 |
| 2,890,397 | 6/1959 | Rendel | 318/146 X |
| 3,178,632 | 4/1965 | Woodson et al. | 322/4 |
| 3,477,013 | 11/1969 | Smith | 322/4 |
| 3,506,095 | 4/1970 | Weaver | 187/29 R |
| 3,609,426 | 9/1971 | Gaul | 310/113 X |
| 4,494,050 | 1/1985 | Godfrey et al. | 318/154 X |

Primary Examiner—William M. Shoop, Jr.
Assistant Examiner—Shik Luen Paul Ip
Attorney, Agent, or Firm—Marshall & Melhorn

[57] ABSTRACT

An improved power supply and drive system for an elevator is disclosed. An electric motor is connected to an electrical power source for a building. The electric motor is mechanically connected through a start-up clutch and an override clutch to a bevel gear assembly. A flywheel is also mechanically connected to the bevel gear assembly. The bevel gear assembly is connected through a disconnectig clutch to a conventional Ward Leonard elevator drive system, which includes a generator and a hoist motor. The electric motor is sized to generate a power output representing the integrated or average requirement of the elevator system over its prolonged duty, typically one-fourth of the size required in conventional systems. The bevel gear assembly, the flywheel, and the various clutches are provided to store energy used to operate the elevator during the relatively brief power surge requirements of the elevator system.

15 Claims, 2 Drawing Figures

ELEVATOR POWER SUPPLY AND DRIVE SYSTEM

BACKGROUND OF THE INVENTION

The present invention relates in general to elevator operating mechanisms and in particular to an improved power supply and drive system for an elevator.

Many elevator power supply and drive systems are known in the art. Such systems are adapted to selectively rotate a cylindrical drum upon which an elevator car and counterweight are suspended by cables. Typically, a Ward Leonard system is provided having a generator driving a hoist motor which rotates the drum. An electric motor is normally connected to a power source for the building in which the elevator is located in order to drive the generator. Additionally, in most buildings, an emergency generator is provided as a back-up power source for the electric motor in case of a power failure in the building.

One problem encountered in the design of such elevator systems is that both the electric motor for driving the Ward Leonard generator and the emergency generator must have sufficient capacity to fulfill both the average power requirement of the elevator system during normal operation and the instantaneous power surge requirements encountered during use. Unfortunately, the cost of constructing large electric motors and generators capable of handling these power surge requirements is quite high. It is also inefficient to utilize such large electric motors and emergency generators, since their full capacity is only infrequently needed. Accordingly, it would be desirable to provide a power supply and drive system for an elevator which generates a steady flow of power representing the integrated requirement of the elevator over its prolonged duty period, yet is capable of handling relatively high instantaneous power surge requirements.

SUMMARY OF THE INVENTION

The present invention relates to an improved power supply and drive system for an elevator. A motor starter is connected through a switch to an electrical power source for a building. In the event of a power failure, the motor starter can be connected through the switch to an emergency generator. The motor starter is connected to an electric motor which is mechanically coupled through a start-up clutch and an override clutch to an input to a bevel gear assembly. A flywheel is mechanically coupled to another input of the bevel gear assembly. An output of the bevel gear assembly is connected through a disconnecting clutch to a conventional Ward-Leonard elevator drive system, which includes a generator and a hoist motor. The electric motor is sized to generate a steady flow of power representing the integrated requirement of the elevator system over its prolonged duty, typically one-fourth of the size normally required. Kinetic energy is stored in the flywheel and released through the bevel gear assembly to the Ward Leonard system to handle the relatively brief power surge requirements of the elevator system.

It is an object of the present invention to provide an improved power supply and drive system for an elevator.

It is another object of the present invention to provide such a power supply and drive system which generates a steady flow of power representing the integrated requirement of an elevator over its prolonged duty period, yet is capable of handling the brief power surge requirements of the elevator system.

It is a further object of the present invention to provide a power supply and drive system for an elevator utilizing a smaller, less expensive electric motor than has previously been available.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figures 1, 2:
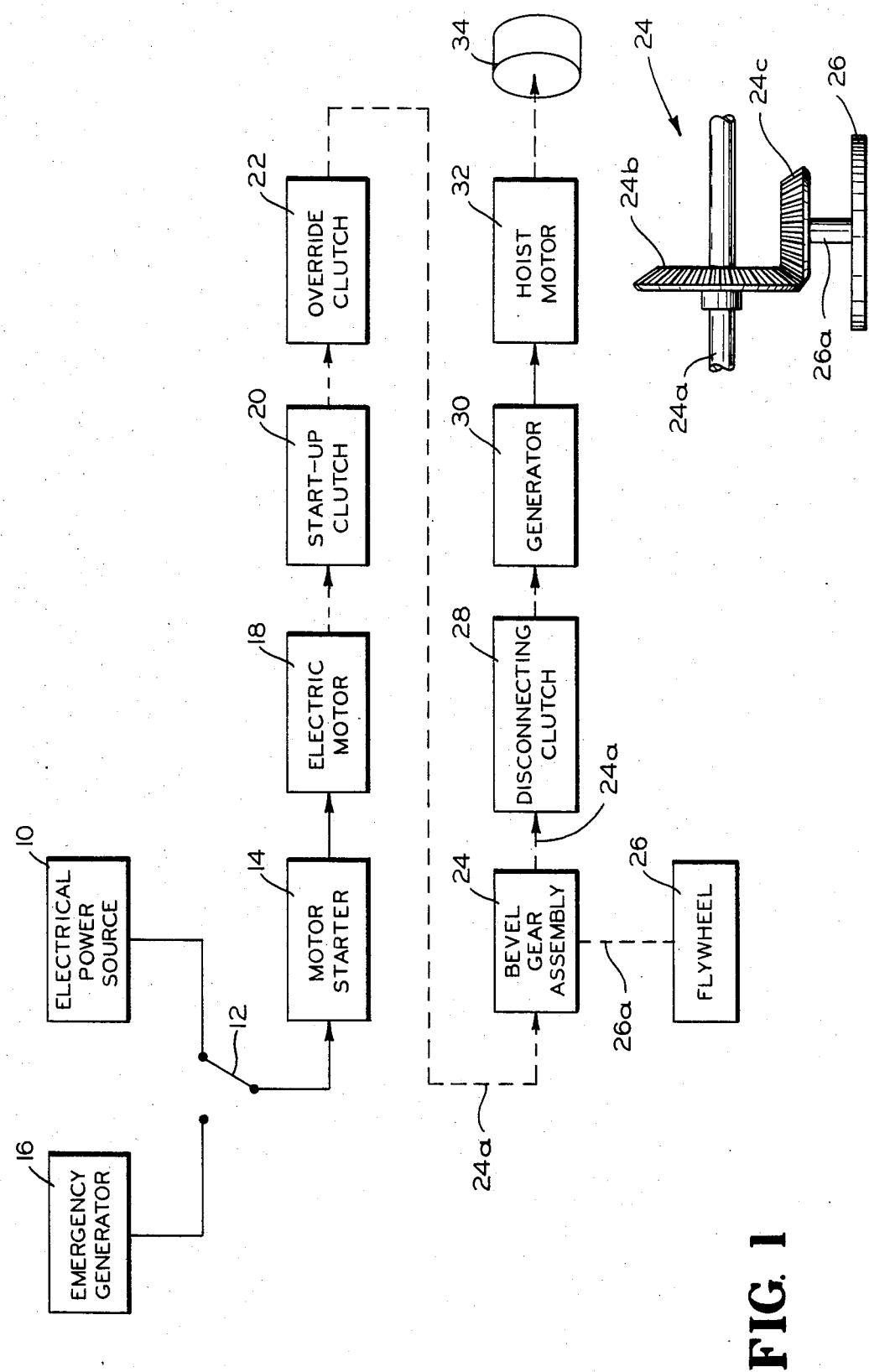
FIG. 1 is a block diagram of an improved power supply and drive system for an elevator in accordance with the present invention.
FIG. 2 is an elevational view schematically illustrating the bevel gear assembly and flywheel of power supply and drive system illustrated in FIG. 1.

Referring now to FIG. 1, there is illustrated an improved power supply and drive system for an elevator in accordance with the present invention. A conventional electrical power source 10 is connected through the power lines of a building and a switch 12 to a motor starter 14. An emergency generator 16 is adapted to be alternatively connected to the motor starter 14 by the switch 12 in case of a failure of the electrical power source 10. The motor starter 14 is connected to an electric motor 18 which is mechanically connected through a start-up clutch 20 and an override clutch 22 to a bevel gear assembly 24. A flywheel 26 is mechanically connected to the bevel gear assembly 24. The bevel gear assembly 24 is mechanically connected through a disconnecting clutch 28 to a generator 30. The generator 30 is electrically connected to a hoist motor 32. The hoist motor 32 is mechanically coupled to rotate a cylindrical drum 34 upon which an elevator car and counterweight (not shown) may be suspended by cables or other means.

The generator 30 and hoist motor 32 can be part of a conventional Ward Leonard drive system, wherein the generator 30 is connected in series with the hoist motor 32. The generator 30 generates a direct current to actuate the hoist motor 32. The speed at which the hoist motor 32 is driven is controlled by the voltage generated by the generator 30, while the torque generated by the hoist motor 32 is controlled by the current supplied by the generator 30. The electric motor 18 driving the generator 30 can be a three-phase, two-pole alternating current induction motor having a synchronous speed of 3,600 revolutions per minute. The electric motor 18 generates a mechanical output, such as rotating a shaft, at a horsepower which is equal to the average power requirement of the elevator system over its prolonged duty period. Typically, the average power requirement is approximately one-fourth of the relatively brief peak power surge requirements occasionally encountered during use. Thus, the electric motor 18 of the present invention can have a capacity which is approximately one-fourth of the size of the driving motor normally required for a standard Ward Leonard drive system for a given elevator load. The smaller electric motor 14 is considerably less expensive than that which would otherwise be required.

As shown in FIGS. 1 and 2, a rotatable shaft 24a of the bevel gear assembly 24 is connected between the override clutch 22 and the disconnecting clutch 28. The shaft 24a has a first bevel gear 24b keyed or otherwise secured thereto for rotation. A second bevel gear 24c is rotatably supported by any conventional means so as to cooperate with the first bevel gear 24b. The second bevel gear 24c is connected by a shaft 26a to the flywheel 26. Thus, rotation of the shaft 24a by the electric motor 18 causes rotation of the flywheel 26. Typically, the gear ratio of the first bevel gear 24b to the second bevel gear 24c is in the range from 2:1 to 3:1. Accordingly, if the electric motor 18 is operating at a synchronous speed of 3,600 revolutions per minute, the flywheel 26 will be rotated at from 7,200 to 10,800 revolutions per minute, depending upon the gear ratio of the first and second bevel gears 24b and 24c, respectively.

The electric motor 18 drives the generator 30 through the bevel gear assembly 24 and the clutches 20, 22 and 28. As described above, the flywheel 26 is directly geared to the shaft 24a of the bevel gear assembly 24. Thus, the rotational speed of the generator 30 is fixed proportionately with respect to the rotational speed of the flywheel 26. The override clutch 22 is provided between the electric motor 18 and the bevel gear assembly 24 to connect the electric motor 18 to the flywheel 26 only so long as the rotational speed of the flywheel 26 is less than or equal to the synchronous speed of the electric motor 18. If the rotational speed of the flywheel 26 exceeds the synchronous speed of the electric motor 18, the motor 18 will be disconnected by the override clutch 22 to prevent it from being driven by the flywheel 26.

The flywheel 26 is designed to have sufficient rotational inertia, when rotated by the electric motor 18 at or near the synchronous speed, to provide the energy required to drive the generator 30 at least one full cycle of operation (i.e., lifting a full load from the bottom floor to the top floor and returning empty) in the event of a complete failure of both the electrical power source 10 and the emergency generator 16. It has been found desirable to form the flywheel 26 from a steel disc having approximate dimensions of a diameter of two feet and a thickness of one inch. If the bevel gear assembly 24 has a 2:1 gear ratio, as described above, then the flywheel 26 will be rotated at 7,200 revolutions per minute. The kinetic energy of the flywheel 26 in this instance would be approximately 568,500 foot-pounds, sufficient to drive the generator 30 at least one full cycle of operation as described above.

In operation, the motor starter 14 initially starts the electric motor 18 when power is first applied to the system. Once the electric motor 18 has reached its synchronous speed, the start-up clutch 20 is utilized to connect the motor to the bevel gear assembly 24 to gradually bring the flywheel 26 up to speed. During this starting period, the disconnecting clutch 28 can be utilized to disconnect the bevel gear assembly 24 from the generator 30. Once the flywheel 26 is up to speed, the disconnecting clutch 28 is utilized to gradually bring the generator 30 up to speed. The disconnecting clutch 28 is also helpful for maintenance purposes, in that the generator 30 and hoist motor 32 can be shut down at any time without stopping the rest of the system.

When the flywheel 26 is up to speed and the elevator is ready to operate, the generator 30 is coupled by the disconnecting clutch 28 to the bevel gear assembly 24 in the manner previously described. The hoist motor 32 is then operated in the normal Ward Leonard manner. As mentioned above, the electric motor 18 is sized to generate an amount of power representative of the average power requirement of the elevator over its prolonged duty period. Thus, such average power requirement of the elevator system is provided by the electric motor 18, the generator 30, and the hoist motor 32. However, as brief peak power surge requirements are encountered by the system, the loads placed on the hoist motor 32 and the generator 30 exceed the capacity of the electric motor 18 to continue driving them at the synchronous speed. In such instances, the rotational energy of the flywheel 26 provides the stored energy necessary to continue driving the generator 30 and hoist motor 32, thereby relieving the electric motor 18 of this responsibility for a relatively short period of time. Since the electric motor 18 is much smaller in size than is normally required in a conventional Ward Leonard system, it will be appreciated that the emergency generator 16 can also be down-sized by the same amount, resulting in additional cost savings.

When the elevator system acts in a regenerative mode, such as when lowering a heavy load, the hoist motor 32 may act as a generator to drive the generator 30 as a motor. In prior art elevator systems, the electric motor 18 could then be over-driven by the generator 30 under such conditions. However, in the present elevator system, the extra energy generated by the generator 30 is stored in the flywheel 26. The override clutch 22 provided between the bevel gear assembly 24 and the electric motor 18 prevents the electric motor 18 from being over-driven beyond its synchronous speed by the flywheel 26 or the generator 30.

In accordance with the provisions of the patent statutes, the principle and mode of operation of the present invention has been explained and illustrated in its preferred embodiment. However, it must be appreciated that the present invention can be practiced otherwise than as specifically explained and illustrated without departing from its spirit or scope.

What is claimed is:

1. A power supply and drive system for operating an elevator comprising:
   a power source;
   means connected to said power source for generating a mechanical output at an energy level limited to approximately the average power requirement of the elevator over a prolonged duty period;
   means for storing energy coupled to said mechanical output generating means for storing energy when an actual power requirement of the elevator is less than said average power requirement and for supplying such stored energy when the actual power requirement of the elevator exceeds said average power requirement; and
   drive means coupled between said mechanical output generating means at one input and the elevator at an output, and coupled between said energy storage means at another input and the elevator at said output for operating the elevator.

2. The invention defined in claim 1 wherein said mechanical output generating means includes an electric motor connected to said power source and coupled to said drive means.

3. The invention defined in claim 2 wherein said mechanical output generating means further includes a motor starter connected between said electric motor and said power source.

4. The invention defined in claim 1 further including start-up clutch means for selectively connecting said mechanical output generating means to said energy storage means.

5. The invention defined in claim 1 further including override clutch means connected between said mechanical output generating means and said energy storage means for coupling said mechanical output generating means to drive said energy storage means but preventing said energy storage means for driving said mechanical output generating means.

6. The invention defined in claim 1 wherein said drive means includes a bevel gear assembly having said one coupled to said mechanical output generating means and said another input coupled to a flywheel included in said means for storing energy.

7. The invention defined in claim 6 wherein said bevel gear assembly includes a first bevel gear secured to a shaft connected between said mechanical output generating means and said drive means and a second bevel gear connected to said flywheel and engaging said first bevel gear.

8. The invention defined in claim 7 wherein the gear ratio of said first bevel gear to said second bevel gear is in the range of 2:1 to 3:1.

9. The invention defined in claim 1 further including disconnecting clutch means for selectively connecting said energy storage means to said drive means.

10. The invention defined in claim 1 wherein said drive means includes generator means connected to said mechanical output generating means and to said energy storage means and hoist motor means coupled to the elevator, said generator means and said hoist motor means being connected together to operate the elevator.

11. A method of operating an elevator power supply and drive system comprising the steps of:
(a) connecting means for generating a mechanical output to a power source and operating said means for generating a mechanical output at an energy level limited to approximately the average power requirement of an elevator over a prolonged duty cycle;
(b) coupling said means for generating a mechanical output to means for storing energy and storing energy when the actual power requirement of said elevator is less than said average power requirement;
(c) coupling said means for generating a mechanical output to a drive means for said elevator; and
(d) coupling said means for storing energy to said drive means for supplying stored energy to said drive means when the actual power requirement of the elevator exceeds said average power requirement.

12. The method according to claim 11 wherein said step (a) includes providing an electric motor having a power output approximately one fourth of the peak actual power requirement of the elevator as said means for generating a meachanical output.

13. The method according to claim 11 wherein said step (b) includes providing a flywheel as said means for storing energy.

14. The method according to claim 13 wherein said flywheel stores energy sufficient to drive the elevator during at least one full cycle of operation.

15. An elevator power supply and drive system comprising:
an electric motor having an output shaft coupled to an override clutch;
a bevel gear assembly having first and second inputs and an output, said first being coupled to said override clutch;
a flywheel coupled to said second input of said bevel gear assembly; and
a generator coupled to said output of said bevel gear assembly and electrically connected to a hoist motor for driving an elevator at its actual power requirement whereby said electric motor operates to drive said generator through said bevel gear assembly at an energy level limited to approximately the average power requirement of the elevator over a prolonged duty cycle, said flywheel stores energy from said electric motor when the actual power requirement of the elevator is less than the average power requirement and provides energy to said generator when the actual power requirement exceeds the average power requirement, and said override clutch prevents said electric motor from being driven through said bevel gear assembly.

* * * * *